No. 781,008.	Patented January 31, 1905.

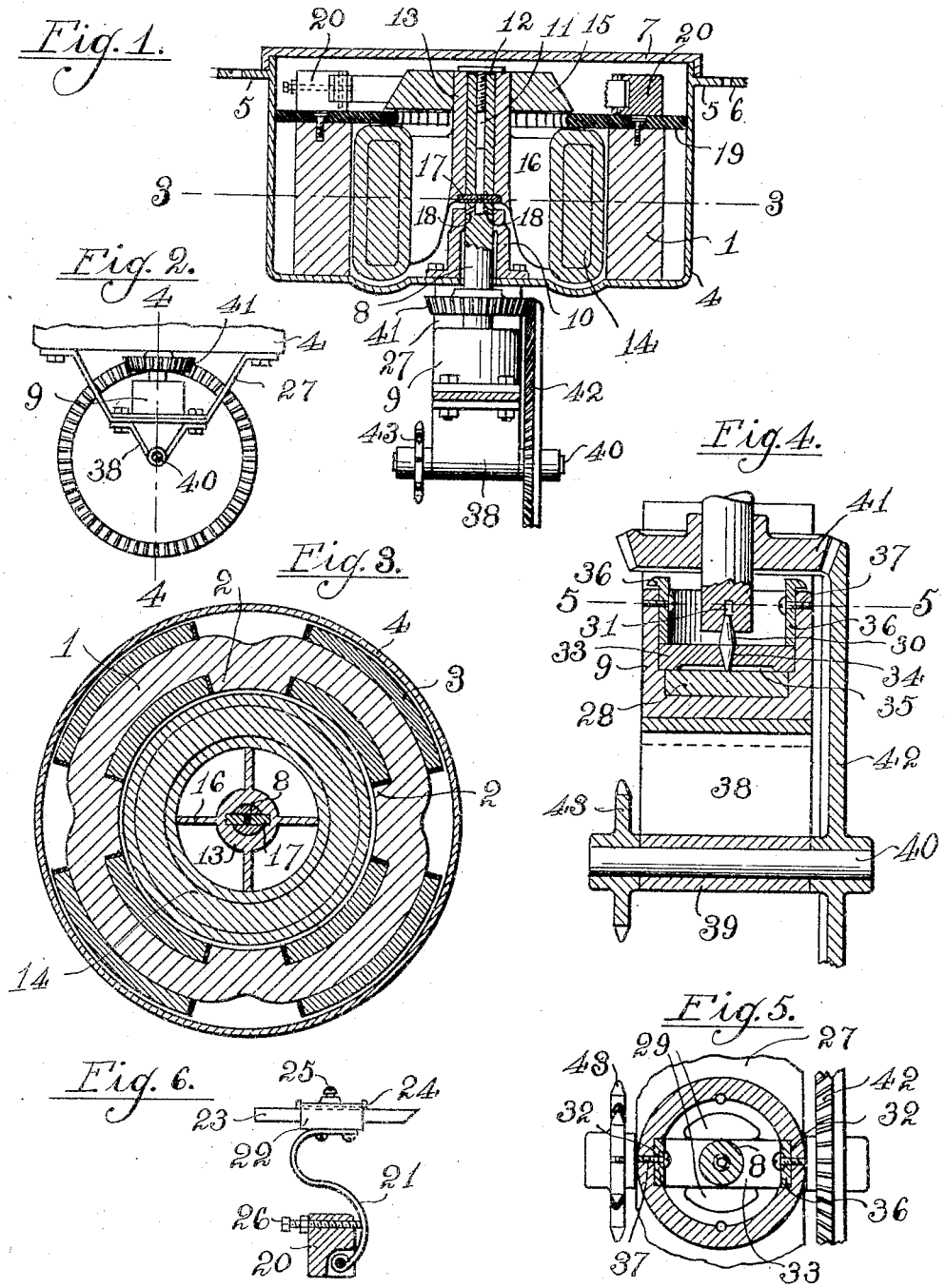

UNITED STATES PATENT OFFICE.

MICHEL KOENER, OF CHICAGO, ILLINOIS.

ELECTRIC MOTOR.

SPECIFICATION forming part of Letters Patent No. 781,008, dated January 31, 1905.

Application filed May 18, 1904. Serial No. 208,620.

*To all whom it may concern:*

Be it known that I, MICHEL KOENER, a citizen of the United States, residing at Chicago, in the county of Cook and State of Illinois, have invented certain new and useful Improvements in Electric Motors; and I do hereby declare the following to be a full, clear, and exact description of the invention, such as will enable others skilled in the art to which it appertains to make and use the same.

My invention relates to a novel construction in an electric motor particularly designed for use in automobiles, the object being to provide a motor the shaft and revolving parts of which are vertically disposed and which is relatively flat, so as to occupy minimum space, and consists in the features of construction and combinations of parts hereinafter fully described and claimed.

In the accompanying drawings, illustrating my invention, Figure 1 is a central vertical section of a motor constructed in accordance with my invention. Fig. 2 is a fragmentary detail side elevation showing the step-bearing and counter-shaft bearing of said motor. Fig. 3 is a plan section on the line 3 3 of Fig. 1. Fig. 4 is a detail vertical section, on an enlarged scale, on the line 4 4 of Fig. 2. Fig. 5 is a plan section on the line 5 5 of Fig. 4.
Fig. 6 is a detail plan view showing the means for holding the brushes in contact with the commutator.

My invention resides chiefly in so constructing an electric motor that the same occupies a relatively very small space vertically, so that when the same is mounted on the automobile it will be as much as possible out of sight, and, further, in so constructing same that it is rendered substantially dust-proof and so that the working parts of same may be readily gotten at for purposes of cleaning, oiling, and repairing.

A further object consists in so constructing the motor as to obtain relatively the greatest efficiency.

To these and other ends my motor comprises a field-magnet 1, consisting, preferably, of a cast-steel ring provided at intervals with inwardly-extending projections 2, which form the poles of the magnet, the same being wound between said poles with coils 3, the windings of the latter being so disposed as to cause the magnetic circuits alternately to flow in opposite directions, thereby producing a number of circuits corresponding with the number of said poles 2. The said field-magnet 1 is centrally mounted in a casing 4 of a non-magnetic metal so arranged as to form a close fit, said casing being provided at its upper end with an annular flange 5, having projections 6 for reception of bolts to secure the same to the vehicle-frame, and is closed by means of a flanged cover 7, rendering said casing substantially dust-proof. In its lower wall the said casing 4 is provided with a central opening for the passage of the shaft 8 of said motor, which is journaled at its lower end in a step-bearing 9, which will be hereinafter more fully described, and between its ends in a bearing 10, which is mounted on the lower wall of said casing 4. The said shaft is hollow in its upper end portion to form an oil-reservoir 11 and is closed by a screw 12, having an enlarged flat head which bears upon the upper end of the hub 13 of the armature 14 and commutator 15. The said hub 13 carries a plurality of spokes 16, upon the free ends of which said armature 14 is carried, the said spokes projecting below the lower end of said hub 13. In the lower end of said hub are two recesses which are adapted to receive the ends of the cross-head 17, passing through said shaft 8, and through which is an opening for the passage of the oil to permit the latter to flow through the radial openings 18, through which said oil-reservoir 11 communicates with said bearing 10. Said shaft is thus held rigid with said hub and is revolved thereby.

Mounted upon the upper face of said field-magnet 1 is a fiber ring 19, which closely fits said casing 4 and the central opening of which is of less diameter than the largest diameter of said commutator 15, the latter being preferably slightly tapered for reasons which will be hereinafter explained. Mounted on said ring 19 are brush-holders 20, each of which consists of a block upon which an ogee-curved spring 21 is pivoted on one end and the free end of which carries an annular sleeve 22 in which the carbon brush 23 is mounted, said brush being held rigid therein by means of the follower-plate 24 and set-screw 25 bearing against the latter. The tension of said spring, or, in other words, the pressure of the brush on the commutator, is regulated by means of the set-screw 26, mounted in said block 20 and bearing at one end against said spring 21. During the operation of the motor it is obvious that a certain amount of fine carbon dust is worn off of said brushes, and it is advisable that such dust shall be prevented from settling on the armature or in the coils of the field-magnet. Such dust will obviously be carried by centrifugal force to the point of largest diameter of said commutator and thence will fall upon said fiber ring 19, from which it may be readily removed.

Mounted upon the bottom wall of said casing 4 is a hanger 27, upon which is mounted the step-bearing 9, the latter comprising a cup in the bottom of which is a ring 28, having two openings 29 at diametrically opposite points and upon the middle of which one end of a double cone 30 rests, the other end of said double cone 30 entering a longitudinal opening 31 in the lower end of said shaft 8. The said cup 9 is provided on its inner face at diametrically opposite points with recesses 32, in which the ends of a rectangular plate 33 are received, the latter being provided with a tapered central opening 34 for the passage of the lower end portion of said double cone 30, and in the lower face of which is a recess 35, which permits the free access of oil to said opening 34 and the bearing-point of said double cone on said ring 28. In order to prevent displacement of said ring 28 and plate 33, keys 36 are mounted on said recess 32 and are held in place by means of said screws 37. Secured to said hanger 27 is a second hanger 38, which carries a sleeve-bearing 39 for the counter-shaft 40, which is geared to said shaft 8 by means of the bevel-pinion 41 of the latter meshing with the bevel-gear 42 on said counter-shaft 40, the latter carrying a sprocket-pinion 43, by means of which it is geared to one of the axles of the vehicle.

In electrically-propelled automobiles the greatest difficulty experienced resides in the proper care of the motor, the latter being usually very difficult of access, owing to the fact that it must necessarily be well incased to prevent dust and gravel from being admitted, and as a result such matters are usually the source of a great deal of trouble and annoyance. An electric motor to be efficient must be kept very clean. This is particularly true of the commutator and brushes, as the slightest film of foreign matter on such commutator or the contact ends of said brushes results in a great loss of efficiency, due to increased resistance. My said motor, is particularly designed with a view to permitting ready access to all parts of the motor, and it will be noted that by removing the cover 7 the commutator and brushes are exposed and can be cleaned and adjusted without trouble. All working parts of said motor are also rendered readily removable, as by removing the fiber ring 19 and loosening the bevel-pinion 41 the entire armature, commutator, and shaft 8 may be withdrawn and readily replaced. The said cup 9 is adapted to receive oil to a level slightly above the upper face of the plate 33, so that the bearing-surfaces below said level will be constantly fed and maintained cool, the cone being designed to be wedged into the opening in the lower end of said shaft 8 and revolved with the latter. In designing my said motor it is also one of my objects to employ an armature of relatively large diameter and comparatively small length, so that in revolving the same will exert a greater leverage and will accordingly be substantially more powerful in its action than an armature of very small diameter. The said larger armature will of course be revolved at substantially smaller speed than the smaller one would be in the application of the same energy.

I claim as my invention—

1. A motor comprising an annular field-magnet provided at intervals with radial projections forming poles, and wound between said projections, a cylindrical casing concentric with said field-magnet in which the latter is rigidly mounted, said casing being open at its upper end, a vertical shaft concentric with said field-magnet, an armature and commutator carried thereby at its upper end, a step-bearing below said casing receiving said shaft, a bearing mounted on the bottom of said casing and extending upwardly and receiving said shaft, an annular insulating-ring mounted on the upper end of said field-magnet and projecting between the armature and commutator, adjustable brush-holders mounted on said insulating-ring, and a cover for said casing.

2. The combination with a motor having a vertical shaft, of a cylindrical casing of non-magnetic metal receiving said motor, said casing being open at its upper end and adapted to be closed by a cover, a step-bearing carried by said casing and receiving said vertical shaft and comprising a cup, a supporting member in the bottom of same, a double cone entering an opening in the lower end of said shaft and resting on said supporting member, and a plate having a central tapered opening disposed above said supporting member and receiving the lower end of said double cone to hold same against lateral movement.

3. The combination with the frame, of a cylindrical casing mounted thereon, said casing being open at its upper end and adapted to be closed by a cover, a sleeve-bearing mounted on the bottom of said casing concentrically therewith and projecting upwardly therein, a step-bearing secured to said casing and extending below the same, a vertical shaft journaled in said bearings and having a central recess in its upper end communicating with said sleeve-bearing through radial openings, a hub rigidly mounted on the upper end of said shaft, spokes thereon extending below said hub and around said sleeve-bearing, an armature and commutator carried by said hub, a field-magnet mounted in said casing, a ring of insulating material closely fitting said casing mounted on said field-magnet and projecting between said armature and commutator, and a plurality of brush-holders mounted on said insulating-ring.

4. The combination with the frame, of a motor having a vertical shaft supported thereon, a casing for said motor concentric with said shaft, a step-bearing supporting said shaft, a sleeve-bearing in said casing supporting said shaft between its ends, a hub on the upper end of said shaft, spokes on said hub projecting downwardly and carrying the armature, and a commutator at the upper end of said hub, said shaft having a central opening in its upper end and radial opening establishing communication between said central opening and said sleeve-bearing for lubricating the latter.

5. The combination with the motor having a vertical shaft carrying the armature, of a step-bearing in which said shaft is journaled at its lower end, said bearing comprising a cup, a supporting-plate mounted therein, a double cone mounted at one end in a central opening in the lower end of said shaft and resting on said supporting member, a centering member comprising a plate having a tapered central opening adapted to receive the lower end of said double cone and having a recess in its lower face to freely admit oil contained in said cup to the point of contact of said double cone with said supporting member, and means for rigidly securing said supporting and centering members in said cup.

In testimony whereof I affix my signature in presence of two witnesses.

MICHEL KOENER.

Witnesses:
RUDOLPH WM. LOTZ,
E. F. WILSON.